United States Patent

[11] 3,633,157

[72] Inventor Paul D. Schuh
 Oxnard, Calif.
[21] Appl. No. 11,607
[22] Filed Feb. 16, 1970
[45] Patented Jan. 4, 1972
[73] Assignee The United States of America as represented by the Secretary of the Navy

[54] HELICOPTER VISUAL-POSITIONING AID
1 Claim, 5 Drawing Figs.

[52] U.S. Cl. .................................................. 340/25
[51] Int. Cl. .................................................. G08g 5/00
[50] Field of Search ........................................ 340/25–27, 24; 40/217; 240/1.2; 244/114

[56] References Cited
UNITED STATES PATENTS

| | | | |
|---|---|---|---|
| 3,305,826 | 2/1967 | Kaplan | 240/1.2 |
| 3,474,406 | 10/1969 | Gilstrap | 340/25 |
| 3,537,066 | 10/1970 | Stingl | 340/25 |
| 2,403,610 | 7/1946 | Pride | 240/1.2 |
| 2,597,321 | 5/1952 | Hergenrother | 340/26 |
| 2,756,407 | 7/1956 | Toulmin, Jr. | 340/26 |
| 3,366,923 | 1/1968 | Panerai et al. | 340/25 |

*Primary Examiner*—Kathleen H. Claffy
*Assistant Examiner*—Thomas L. Kundert
*Attorneys*—Richard S. Sciascia, Q. Baxter Warner and Howard J. Murray, Jr.

ABSTRACT: Apparatus for providing the pilot of a helicopter with a visual reference, including approach, positioning and hover data, to facilitate his maneuvering and maintaining the helicopter centered above a desired point such as the deck of a vessel at sea during Vertical Replenishment Operations, the structural configuration of the helicopter being such that the pilot can not see either the load suspended from the helicopter or the receiving area on the vessel's deck. The invention apparatus comprises two stabilized targets at separated deck locations, each target including a backboard and a central reference member which appears to the pilot to move across the backboard as the helicopter changes position. The respective optical axes of the targets intersect at a point where the helicopter should be in order to carry out the operation properly. Thus, by maintaining each reference member centered on its associated backboard, the pilot is assured of a correct position for hookup or disconnect of a load on the deck receiving area.

INVENTOR
PAUL D. SCHUH

TOO HIGH
(d)  56

TOO FAR LEFT
(b) 52

ON CENTER
(a) 30 / 32

TOO FAR RIGHT
(c) 54

TOO LOW
(e) 58

HELICOPTER VISUAL-POSITIONING AID

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

A number of arrangements have been proposed for providing positional information to the pilot of a helicopter approaching and hovering over a given point. Such knowledge is essential, for example, during so-called Vertical Replenishment Operations wherein supplies are lowered from a helicopter to the deck of a ship at sea. Because of the configuration of the helicopter, the pilot can not see either the load suspended from the helicopter or the landing area on the ship. Consequently, he is operating "blind" unless he is informed as to the relative position of a load and deck area.

Usually, this information is supplied verbally to the pilot from a crewman on board the helicopter. However, this method is not completely satisfactory for the following reasons:

1. The data supplied by the crewman lags behind rapid changes in relative position of ship and helicopter during a heavy sea or under adverse weather conditions, and often is not graphic enough for the pilot to completely comprehend the environmental changes which occur;

2. Depth perception during low-light or night conditions is markedly reduced, rendering the safety of the operation minimal; and 3. Difficulty of maintaining verbal communication during high winds or storms.

As a consequence, it has frequently been necessary to postpone needed replenishment operations under low-visibility conditions.

One proposed solution to the above problem is set forth in U.S. Pat. No. 3,474,406 issued Oct. 21, 1969 to J. B. Gilstrap. This arrangement therein set forth comprises a glide slope indicator in which a portion of an annular beam of light is obscured when an aircraft deviates from an oncenter approach toward the light. Although this proposal is very effective for fixed-wing aircraft, it lacks one very important factor for helicopters in that it provides only two of the three dimensions required to define a point in space. In other words, it yields a linear optical axis (the approach path) and the aircraft pilot, observing an annular beam, knows he is on the proper approach path for a landing. However, he does not know where his aircraft is along that path.

A second reference is required to provide the third dimension necessary to define a point along such axis. Although the approach line marked on the ship's deck can be utilized for such second reference when a helicopter is at some distance from a vessel, it is not visible when the helicopter is actually hovering over the deck landing area.

SUMMARY OF THE INVENTION

The present concept in a preferred embodiment incorporates two ship-or-ground-based optical units the respective axes of which intersect at the predetermined point in space above a ship's deck or other area where a helicopter should be in order to carry out a discharge or retrieval operation in optimum fashion. Each optical unit is arranged somewhat in the fashion of the single indicator of U.S. Pat. No. 3,474,406 except that an improved image is presented to the pilot in the form of a rectangular background, portions of which are differently colored for better visibility. Furthermore, by reading and maintaining a position in space where the helicopter is on the respective optical axes of both units, the pilot is assured that his craft is aligned with the landing area in both azimuth and elevation.

STATEMENT OF THE OBJECTS OF THE INVENTION

One object of the present invention, therefore, is to provide a visual-positioning aid especially useful to the pilot of a helicopter in hovering above a given area such as the deck of a ship at sea.

Another object of the invention is to give three-dimensional data to a helicopter pilot to facilitate transfer of a helicopter-carried load to or from a landing area.

A further object of the invention is to provide a visual-positioning aid for helicopters in the form of an assembly including a multicolored blackboard, the visible area of which is indicative of the amount and extent of deviation of a helicopter from the optical axis of the assembly.

Another object is to increase operational safety in helicopter missions by defining an approach path to a given area.

Other objects, advantages and novel features of the invention will become apparent from the following detailed description of the invention when considered in conjunction with the accompanying drawings wherein:

DESCRIPTION OF THE PREFERRED EMBODIMENTS

Figure 1:
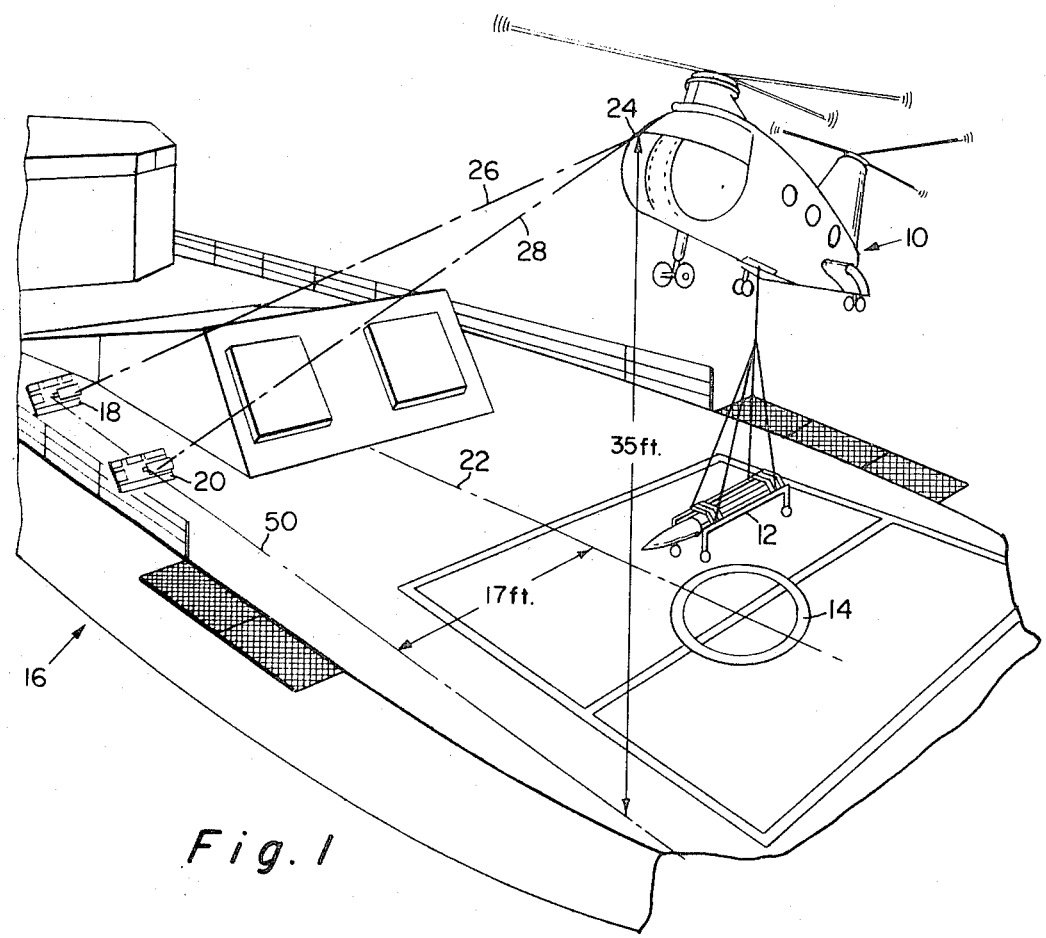
FIG. 1 is a perspective view of a portion of the deck area of a vessel equipped with a pair of optical units designed in accordance with the principles of the invention, and also showing how such units aid the pilot of a helicopter in landing a load on the vessel's deck.

In FIG. 1 of the drawings the present concept is illustrated as being utilized in an environment for which it is particularly adapted. The pilot of a helicopter 10 is attempting to lower a load 12 to the landing area 14 of a vessel 16 at sea. To facilitate the operation, the vessel 16 is equipped with a pair of similar optical devices, hereinafter termed Aid Display Units 18 and 20 designed in a manner set forth below, these devices 18 and 20 being installed in spaced-apart locations on the vessel's deck equidistantly outboard of its centerline 22 as illustrated. Purely as an example, one arrangement which has been found to operate satisfactorily provides the helicopter pilot with a hover point 24 (the vertex of the angle formed by the optical axes 26 and 28 of the units 18 and 20, respectively) which is 35 feet (±2 feet) above the ship's deck and 17 feet outboard of the centerline 22. As will appear from the description which follows, the helicopter pilot maneuvers his craft to this required hover point 24 by constantly viewing the two Aid Display Units 18 and 20 until certain optical considerations are satisfied.

Figure 2:
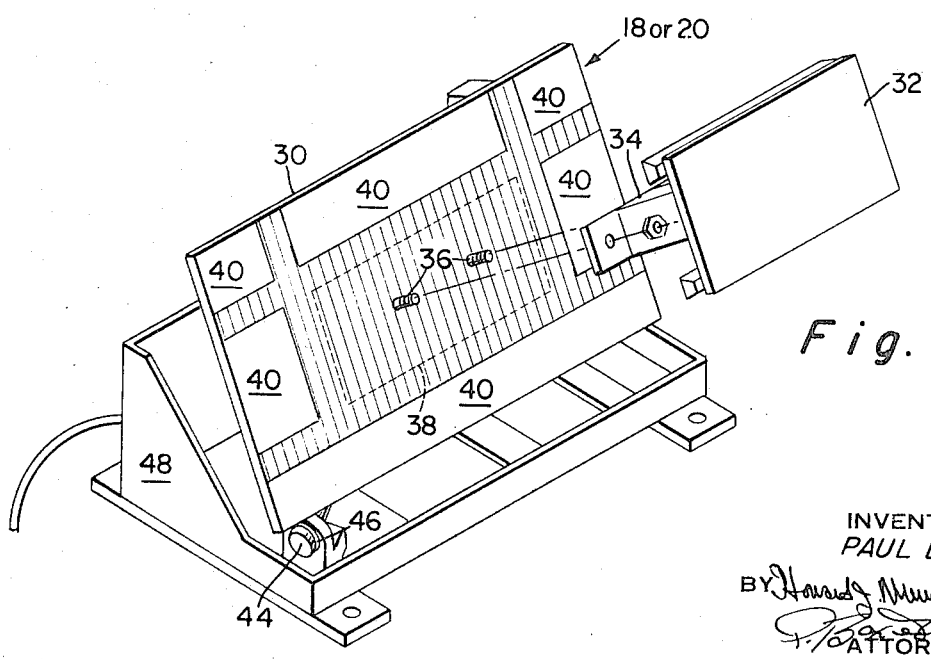
FIG. 2 is a perspective view, in partially exploded fashion, of one of the optical units of FIG. 1.

One of the similar optical units 18 and 20 of FIG. 1 is illustrated in detail in FIG. 2 thru four of the drawings. This unit comprises a background display panel 30, above and in front of which is mounted a further so-called target panel 32 the overall dimensions of which are less than those of panel 30.

Figure 3:
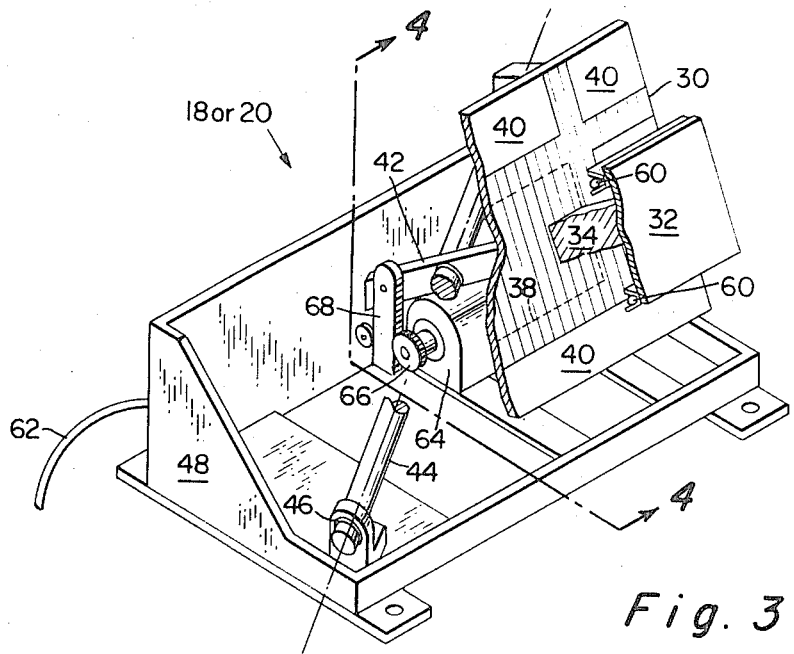
FIG. 3 is a view of FIG. 2 partially broken away to illustrate certain interior details thereof.
Figure 4:
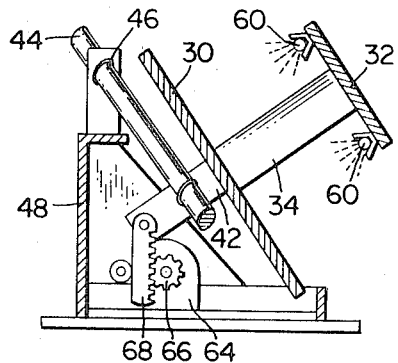
FIG. 4 is a sectional view of FIG. 3 taken along the line 4—3.

As best brought out in FIG. 2, target panel 32 is rectangular in outline, and is supported by a bracket 34 which is attachable to panel 30 by the mounting bolts 36 or other suitable means. Both panels 30 and 32 may be constructed of plywood or other rigid, opaque material. The dimensions of panel 32 are such as to be coextensive with a rectangular central portion of panel 30 within the broken line 38 when the two panels are secured to one another as shown in FIGS. 3 and 4. In other words, a viewer on the optical axis 26, for example, will see the unit 18 as it appears in FIG. 5a.

The area within the broken line 38 in FIG. 2 is given a distinctive color, such as fluorescent red. Other portions of panel 30 are similarly colored, such portions being indicated in FIG. 2 by the vertical shade line. The remaining unshaded portions of FIG. 2 (such as represented by the reference numeral 40) are differently colored (such as black, for example) so as to contrast with the first-mentioned panel portions. The panel 32 is black in its entirety.

Affixed to the back surface of panel 30 is a bar 42 (see FIGS. 3 and 4) attached to a shaft 44 journaled in two bearings 46 (one of which is visible in FIGS. 2 and 3 and the other of which is shown in FIG. 4) so that the panels 30 and 32 can rotate as a unit through a limited angle about the shaft axis. The bearings 46 are carried on opposite sides of a housing or container generally designated by the reference numeral 48. It is important to note that the optical plane of the parallel panels 30 and 32 is normal to the plane in which includes the helicopter hover point 24 and the line 50 above which this hover point lies. The term "hover point" of course refers to the point from which the helicopter pilot views the units 18 and 20. The load 12 is centered about 17 feet rearward (in the example being given) of this viewpoint along the helicopter's longitudinal axis.

It should now be appreciated that when the pilot of helicopter 10 is at any point along the optical axis 26 of aid display unit 18, his view of the aid display unit will be essentially as set forth in FIG. 5a, the panel 32 obscuring the central portion of panel 30 within the broken line 38 (FIG. 2). The symmetrical appearance of the unit 18 will inform him that he is along the axis 26.

However, this data is insufficient in itself for proper guidance in order to land the load 12 within the area 14. Another reference is necessary, and this is provided by the aid display unit 20. Since the respective optical axes of the units intersect at point 24, the pilot knows that if both units 18 and 20 present an appearance such as shown in FIG. 5a, then the helicopter must be above the landing area 14.

Figure 5:
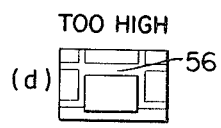
FIG. 5 is a diagrammatic view illustrating the appearance of either of the optical units of FIG. 1 as viewed by the pilot of the helicopter at various deviations from the optical axis of such unit.
Figure 5:
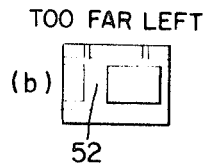
Figure 5:
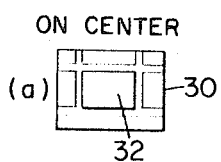
Figure 5:
Figure 5:
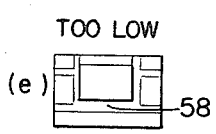

FIG. 5 illustrates the results of a deviation from point 24 by the helicopter pilot. If the helicopter pilot is too far to the left of his desired position as viewed by him, a portion 52 of the area bounded by the line 38 in FIG. 2 will appear. Similarly, a too-far-right position will render visible to the pilot a portion 54 of this area. Too high and too low positions will allow the pilot to see the areas 56 and 58, respectively. It is emphasized that the above considerations apply to both of the display units 18 and 20, and it is only through an alignment of the helicopter along both optical axes 26 and 28 that correct centering of load 12 is possible.

For operation at night or in periods of poor visibility, a pair of fluorescent or infrared lights 60 (FIGS. 3 and 4) are mounted on the rear surface of panel 32 so as to illuminate the top surface of panel 30. They may be energized from any suitable power source, such as over the cable 62 from the main ship's generating system.

It has been found necessary to compensate, at least in part, for motion of the units 18 and 20 caused by roll of the ship 16. Although stabilization systems for ship-mounted equipment have received the attention of many individuals (one example of which is taught by U.S. Pat. No. 3,279,406) it is deemed preferable to utilize the output of the ship's gyro to accomplish this function. Due to the downwash from the helicopter rotor, the expedient of placing the units 18 and 20 on gimbals is not feasible.

Consequently, a servomotor 64 is employed, this motor receiving control signals from the ship's gyro by any suitable means (not shown). The motor 64 carries a pinon gear 66 on its shaft, the gear 66 engaging a rack 68 which is pivotally attached to the bar 42 as best shown in FIGS. 3 and 4. As a result, energization of motor 64 causes a vertical movement of rack 68 and hence a limited rotation of shaft 44 to move the panel assembly 30–32.

The degree of angular relationship between the axis of shaft 44 and the plane of panel 30 is chosen to allow for a normal rolling movement of ship 16 without introducing more than a negligible error into the optical relationships above set forth. For excessive roll in heavy seas, the compensation provided by the stabilization means 64–68 may prove to be inadequate for precise control of the helicopter 10, and hence absolute reliance on the invention system is not advisable under such extreme conditions.

Obviously many modification and variations of the present invention are possible in the light of the above teachings. It is therefore to be understood that within the scope of the appended claims the invention may be practiced otherwise than as specifically described.

I claim:

1. Apparatus for providing the pilot of a helicopter with a visual reference in order to facilitate his maneuvering the helicopter to a point above a desired surface area such as the deck of a ship at sea, and for enabling him to maintain the helicopter centered at such point above said surface area, said apparatus comprising:

a first visual-aid unit mounted on or near said surface area, said first visual-aid unit having an optical axis which passes through said point at which the pilot of said helicopter desires to maintain his craft, said visual-aid unit having a predetermined appearance to said pilot when the latter views such unit along its optical axis, which appearance is different from that which it possesses when viewed from a location other than along its optical axis;

a second visual-aid unit also mounted on or near said surface area and spaced apart from said first visual-aid unit, said second visual-aid unit also having an optical axis which passes through said point at which the pilot of said helicopter desires to maintain his craft, said second visual-aid unit being similar to said first visual-aid unit in that it has a predetermined appearance to said pilot when the latter views such unit along its optical axis which is different from its appearance when viewed by said pilot from a location other than along its optical axis;

each of said first and second visual-aid units comprising a planar background display panel member lying normal to the optical axis of such unit, and a further target panel member laying above and parallel to said background display member, said target panel member being of lesser area than said background panel member and being symmetrically arranged with respect thereto along said optical axis;

each of said panel members being rectangular in configuration;

each of said target panel members being of a particular color, with a surface of said background display member corresponding to the area of said target panel member being of a different particular color, such differently colored area of said background display member being obscured from the view of the pilot of said helicopter when the latter is at a point along the optical axis of such visual-aid unit;

the remaining surface area of said background panel member outside of that corresponding to the area of said target panel member being so colored that, upon the visual-aid unit being viewed from a location other than along its optical axis, the appearance thereof will not only indicate to the viewer that he is off the said optical axis but will also indicate both the direction of such departure and the magnitude thereof, providing that both quantities are within the limits of the unit;

further comprising means for stabilizing each of said visual-aid units at least in part when the surface area on which they are mounted is subject to limited positional displacements; and at least one light source mounted on the rear surface of said target panel member and designed to illuminate the front surface of said background display member, the pilot of said helicopter thus being assured, after maneuvering his helicopter so that each of said two visual-aid units presents its said predetermined appearance, that he is at the intersection of the respective optical axes of such units and hence that the helicopter is centered at the desired point above said surface area.

* * * * *